(12) United States Patent
Cha

(10) Patent No.: US 8,167,465 B2
(45) Date of Patent: May 1, 2012

(54) LED ILLUMINATION MODULE

(75) Inventor: Jin Gil Cha, Anyang Si (KR)

(73) Assignee: Jinyoung I&C Co., Ltd (KR)

( * ) Notice: Subject to any disclaimer, the term of this patent is extended or adjusted under 35 U.S.C. 154(b) by 260 days.

(21) Appl. No.: 12/623,218

(22) Filed: Nov. 20, 2009

(65) Prior Publication Data

US 2010/0127639 A1 May 27, 2010

(51) Int. Cl.
*B60Q 3/04* (2006.01)

(52) U.S. Cl. .................. 362/362; 362/249.02; 362/294; 362/374; 315/185 R

(58) Field of Classification Search .................. 362/217, 362/219, 222, 237, 249, 294, 374, 646, 800; 315/185 R, 291, 294
See application file for complete search history.

(56) References Cited

U.S. PATENT DOCUMENTS

| | | | |
|---|---|---|---|
| 7,165,863 B1 * | 1/2007 | Thomas et al. | 362/219 |
| 7,458,705 B2 * | 12/2008 | Chiba et al. | 362/362 |
| 7,506,995 B2 * | 3/2009 | Thomas et al. | 362/227 |
| 7,832,896 B2 * | 11/2010 | Saha et al. | 362/240 |
| 7,926,976 B2 * | 4/2011 | Schinzel-Kolb et al. | 362/249.02 |
| 7,931,386 B2 * | 4/2011 | Nall et al. | 362/249.02 |
| 2003/0218878 A1 * | 11/2003 | Swaris et al. | 362/234 |
| 2005/0117339 A1 * | 6/2005 | Pan | 362/249 |

\* cited by examiner

*Primary Examiner* — Douglas W Owens
*Assistant Examiner* — Tung X Le
(74) *Attorney, Agent, or Firm* — John K. Park; Park Law Firm

(57) ABSTRACT

The present invention relates to an LED illumination module. The LED illumination module comprises an upper housing configured to have an accommodation unit upwardly protruding at a central portion of the upper housing and to have two or more LEDs mounted in an outer circumference direction of the accommodation unit, a lower housing disposed below the upper housing, a power supply device embedded in the accommodation unit formed in the upper housing and configured to supply a power source to the LEDs, and power source cables placed on sides of the upper housing and the lower housing and configured to supply an external power source to the power supply device.

3 Claims, 4 Drawing Sheets

LED ILLUMINATION MODULE

BACKGROUND OF THE INVENTION

1. Cross-reference to Related Application

Priority to Korean patent application number 10-2008-0116560 filed on Nov. 24, 2008, the entire disclosure of which is incorporated by reference herein, is claimed.

2. Field of the Invention

The present invention relates to an Light-Emitting Diode (LED) illumination module disposed within a specific model frame and configured to emit light and, more particularly, to an LED control module in which two or more LEDs for emitting light and a power supply device for supplying a power source to the two or more LEDs are integrated within a single module.

3. Background of the Related Art

There are various forms of signboards as one of means for advertising using illumination means. Lighting, such as a fluorescent lamp or a neon light, is typically disposed within the signboard.

The lighting, such as the fluorescent lamp or the neon light, is disadvantageous in that the lifespan is short, high power consumption is required, and the lighting inserted into the signboard must be frequently replaced.

Accordingly, LEDs having a semipermanent lifespan and capable of generating various colors are recently being widely used. The LEDs are disposed on a circuit board at regular intervals or on a color basis and are configured to emit light in various forms in response to the control signal of a controller.

However, the proposed LEDs are problematic in that they must be disposed at predetermined positions a signboard in a predetermined pattern. The proposed LEDs are also problematic in that the installation and maintenance tasks are inconvenient because power source lines and data lines drawn from the LEDs must be connected to the controller or the power supply device in a bundle with the LEDs being fixed at the positions.

Furthermore, the proposed LEDs have problems in that the external appearance is poor and electric wires can be short-circuited because several tens or several hundreds of the electric wires are tangled together within the signboard.

In addition, the proposed LEDs are problematic in that the maintenance work is difficult because several tens or several hundreds of electric wires connected between the LEDs and the power supply device or the controller are difficult to identify every LED channel.

SUMMARY OF THE INVENTION

Accordingly, the present invention has been made in view of the above problems occurring in the conventional LED module, and it is an object of the present invention to provide an LED illumination module which is capable of reducing excessive power consumption in the existing fluorescent lamp or neon light, facilitating the installation within a narrow space using the existing external input AC power source, and enabling simple and rapid maintenance when a failure occur.

To achieve the above object, the LED illumination module according to the present invention comprises an upper housing configured to have an accommodation unit upwardly protruding at a central portion of the upper housing and to have two or more LEDs mounted in an outer circumference direction of the accommodation unit, a lower housing disposed below the upper housing, a power supply device embedded in the accommodation unit formed in the upper housing and configured to supply a power source to the LEDs, and power source cables placed on sides of the upper housing and the lower housing and configured to supply an external power source to the power supply device.

In the LED illumination module according to the present invention, voltages of AC power sources, connected in parallel within a specific model frame and externally inputted, are reduced therein and converted into DC voltages. The DC voltages are supplied to LEDs within the LED illumination module.

BRIEF DESCRIPTION OF THE DRAWINGS

Further objects and advantages of the invention can be more fully understood from the following detailed description taken in conjunction with the accompanying drawings in which.

DESCRIPTION OF REFERENCE NUMERALS OF PRINCIPAL ELEMENTS IN THE DRAWINGS

| | |
|---|---|
| 1: | LED illumination module |
| 2: | accommodation unit |
| 3: | LED |
| 4: | upper housing |
| 5: | lower housing |
| 6: | power supply device |
| 7: | power source cables |
| 8: | adhesive injection grooves |
| 9: | shrinking prevention hole |
| 10: | upper connector |
| 11: | lower connector |
| 12: | through holes |
| 13a: | cable guide |
| 13b: | cable guide |
| 14: | circular through holes |
| 15: | fixing screw holes |
| 16: | circuit protection unit |
| 18: | constant voltage generator |
| 17: | rectifying unit |
| 19: | constant current generator |

DETAILED DESCRIPTION OF THE PREFERRED EMBODIMENT

Prior to a detailed description of the present invention, when a detailed description of well-known functions or structures obscures the subject matter of the present invention, the detailed description will be omitted.

Furthermore, the following terms defined with consideration taken of the function in the present invention can vary in accordance with an intention of a user or an operator or usual practices. Therefore, the definition should be defined based on overall contents of the specification describing the LED illumination module according to the present invention.

Figure 1:
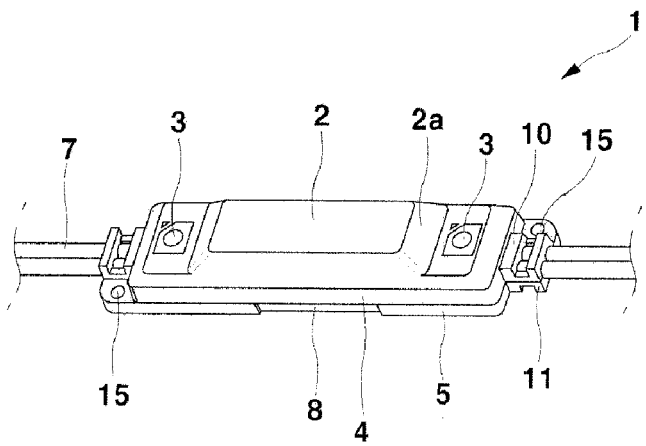
FIG. 1 is a state diagram showing an LED illumination module according to the present invention.
Figure 2:
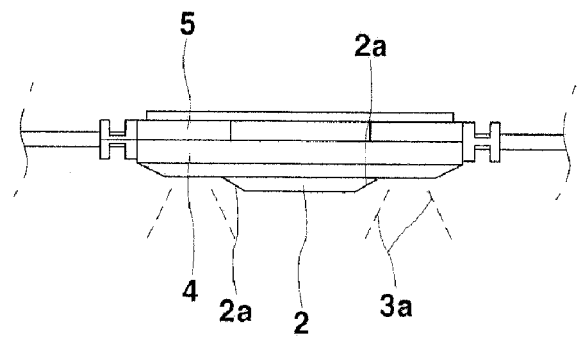
FIG. 2 is a state diagram showing the emission angle of the LED according to the present invention.
Figure 3:
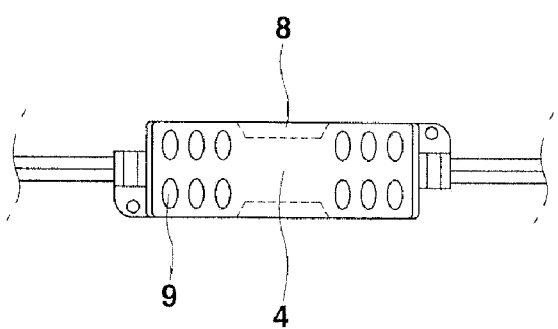
FIG. 3 is a state diagram showing the base plane of the LED illumination module according to the present invention.

FIG. 1 is a state diagram showing an LED illumination module according to the present invention, FIG. 2 is a state diagram showing the emission angle of the LED according to the present invention, and FIG. 3 is a state diagram showing the base plane of the LED illumination module according to the present invention.

Figure 4:
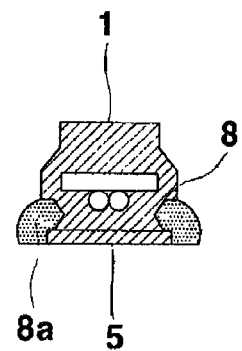
FIG. 4 is a longitudinal sectional view illustrating a state in which an adhesive is injected into the adhesive injection grooves according to the present invention.
Figure 5A:
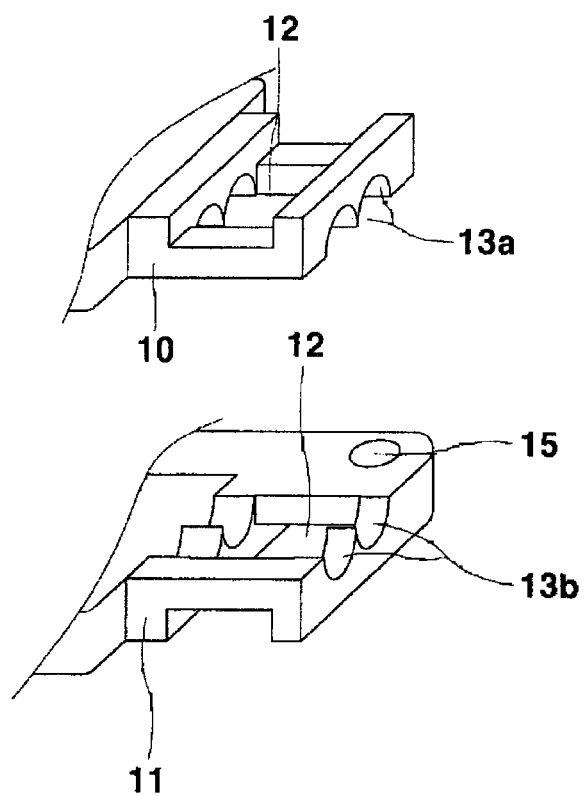
FIG. 5A is an exploded diagram of upper and lower connectors according to the present invention.
Figure 5B:
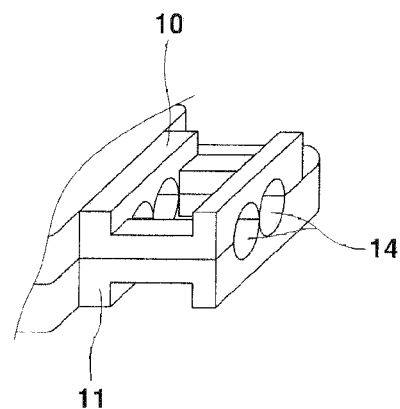
FIG. 5B is an assembly diagram of the upper and lower connectors according to the present invention.
Figure 6:
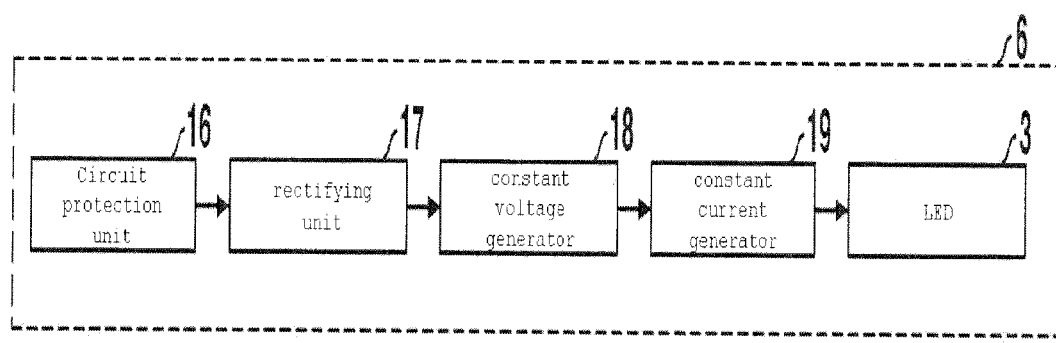
FIG. 6 is a block diagram of a power supply device according to the present invention.

FIG. 4 is a longitudinal sectional view illustrating a state in which an adhesive is injected into the adhesive injection grooves according to the present invention, FIGS. 5A and 5B are an exploded diagram and an assembly diagram of upper and lower connectors according to the present invention, and FIG. 6 is a block diagram of a power supply device according to the present invention.

Figure 7:
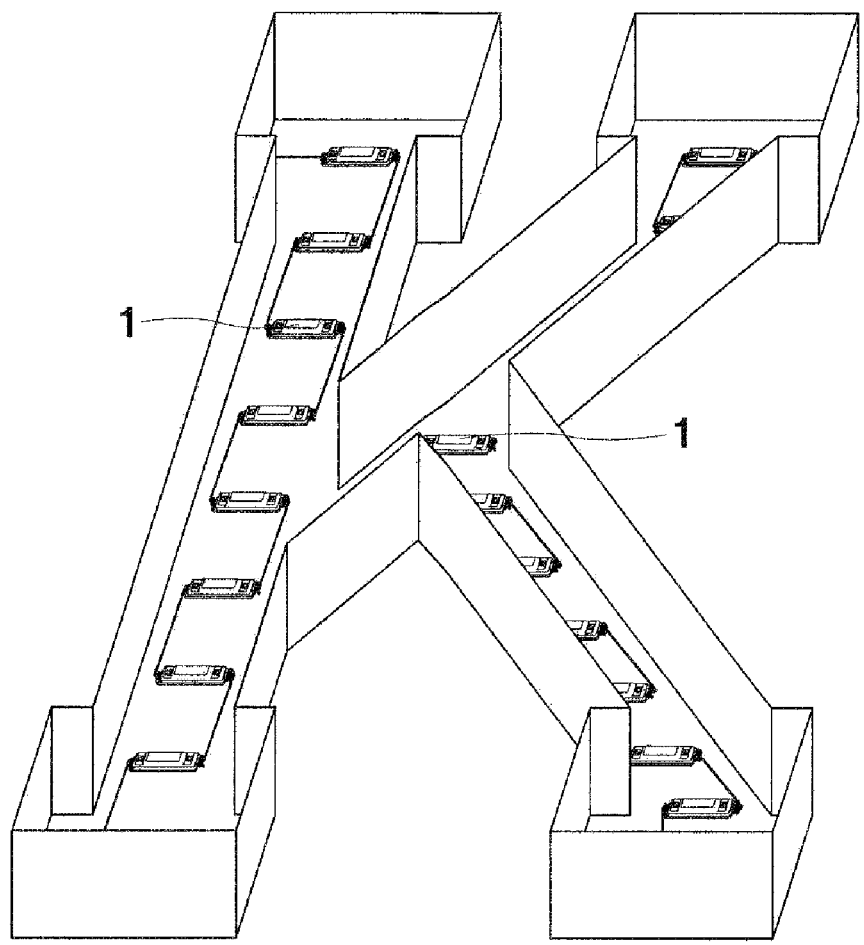
FIG. 7 is a state diagram illustrating a state in which two or more LED illumination modules are connected in parallel to a letter model frame according to the present invention.

Further, FIG. 7 is a state diagram illustrating a state in which two or more LED illumination modules are connected in parallel to a letter model frame according to the present invention.

Referring to the drawings, the LED illumination module 1 according to the present invention includes an upper housing 4 configured to have an accommodation unit 2 upwardly protruding at its central portion and to have two or more LEDs 3 mounted in the outer circumference direction of the accommodation unit 2, a lower housing 5 disposed below the upper housing 4, a power supply device 6 embedded in the accommodation unit 2 formed in the upper housing 4 and configured to supply a power source to the LEDs 3, and power source cables 7 placed on the sides of the upper housing 4 and the lower housing 5 and configured to supply an external power source to the power supply device 6.

The accommodation unit 2 is disposed in the upper housing 4 and is configured to include a circumferential face 2a having an inclined plane such that light of each of the LEDs 3 can have a divergence angle 3a, as shown in FIG. 2.

As shown in FIGS. 1 and FIG. 3, adhesive injection grooves 8 are formed on both lower sides of the lower housing 5 and are concaved in the length direction of the lower housing 5. Thus, the adhesive injection grooves 8 can function to attach the bottom face of the lower housing 5 to a specific position, as shown in FIG. 4. In this state, when an adhesive 8a is injected into the adhesive injection grooves 8, the LED module 1 can be neatly adhered to the specific position.

Two or more shrinking prevention holes 9 are perforated in the bottom face of the lower housing 5, as shown in FIG. 3. The holes function to prevent the lower housing 5 from being shrunk by heat generated from the LEDs 3 interposed between the upper housing 4 and the lower housing 5.

An upper connector 10 and a lower connector 11 are combined in the up and down directions on each of the both sides of the upper housing 4 and the lower housing 5 and are configured to couple the power source cables 7 together, as shown in FIG. 1. Further, through holes 12 are formed in each of the top surfaces of the upper and lower connectors 10 and 11 as shown in FIG. 5A.

Furthermore, cable guides 13a and 13b are formed in each of the upper and lower connectors 10 and 11 on a side where the upper and lower connectors 10 and 11 come into contact with each other. The cable guides 13a and 13b each have a semicircular longitudinal section in the length direction of the upper and lower connectors 10 and 11 as shown in FIG. 5B. Accordingly, when the upper and lower connectors 10 and 11 overlap each other in the up and down directions, the cable guides 13a and 13b of the upper connector 10 and the cable guides 13a and 13b of the lower connector 11 are brought into contact with each other, thereby forming respective circular through holes 14 through which the power source cables 7 can pass.

The upper and lower connectors 10 and 11 constructed as above can prevent part of the upper and lower housings 4 and 5 from being damaged by the power source cables 7 and can also flexibly fold and fix the power source cables 7, extended from the upper and lower housings 4 and 5, in the up/down and right/left directions.

Furthermore, fixing screw holes 15 are respectively formed on both sides of the upper and lower connectors 10 and 11 and are configured to screw the LED illumination module 1 to a specific position, as shown in FIG. 1.

Referring to FIG. 6, the power supply device 6 embedded in the accommodation unit 2 includes a circuit protection unit 16 configured to break overcurrent and overvoltage, a rectifying unit 17 configured to rectify an AC power source, received from the circuit protection unit 16, into a DC power source, a constant voltage generator 18 configured to convert the DC power source into a voltage of a certain level such that the DC power source complies with a driving voltage of the LEDs 3, and a constant current generator 19 mounted on the constant voltage generator 18 and configured to supply the LEDs 3 with only a necessary amount of current received from the constant voltage generator 18.

The power source supplied from the constant current generator 19 is supplied to the LEDs 3.

The circuit protection unit 6 may include a fuse connected in series to an AC power source and a Varistor connected in series or in parallel across an AC power terminal.

The fuse functions to break overcurrent flowing into the power supply device 6, and the Varistor functions to attenuate external input overvoltage or surge impulse and to prevent the overvoltage and surge impulse from flowing into the rectifying unit 17.

Furthermore, the rectifying unit 17 may include a bridge diode configured to rectify the AC power source received from the AC power terminal, and a capacitor connected in parallel to the output terminal of the bridge diode and configured to remove a ripple voltage generated from the bridge diode.

Furthermore, the constant voltage generator 18 and the constant current generator 19 can be constructed by connecting a constant voltage IC and a constant current IC, respectively, to the output terminal of the rectifying unit 17 from which the ripple voltage has been removed.

Referring to FIG. 7, in order to use the LED illumination module 1 having the above construction according to the present invention, a plurality of the LED illumination modules 1 are attached in a predetermined pattern within a specific model frame and are connected in parallel. Next, the AC power source can be connected in series to the LED illumination modules 1 connected in parallel.

Accordingly, the LED illumination module 1 according to the present invention is advantageous in that power consumption and the equipment maintenance cost can be reduced because LEDs can be used instead of the existing fluorescent lamp or neon light, and installation and structural changes are convenient because the power supply device integrally coupled with each module is used instead of separate isolated power supply devices.

As described above, the LED illumination module according to the present invention can reduce power consumption and the equipment maintenance cost because LEDs can be used instead of the existing fluorescent lamp or neon light.

Furthermore, the LED illumination module according to the present invention can be easily installed within a narrow space and simply maintained when a failure occurs because the power supply device integrally coupled with LEDs is used instead of separate isolated power supply devices.

Although the specific embodiment of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A Light-Emitting Diode (LED) illumination module, comprising:
   an upper housing configured to have an accommodation unit upwardly protruding at a central portion of the upper housing and to have two or more LEDs mounted in an outer circumference direction of the accommodation unit, wherein the accommodation unit placed in the upper housing includes a circumferential face having an inclined plane such that light of each of the LEDs having a divergence angle;
   a lower housing disposed below the upper housing;
   a power supply device embedded in the accommodation unit formed in the upper housing and configured to supply a power source to the LEDs;
   power source cables placed on sides of the upper housing and the lower housing and configured to supply an external power source to the power supply device;
   adhesive injection grooves concaved in a length direction of the lower housing and formed on both lower sides of the lower housing;
   two or more shrinking prevention holes perforated in a bottom face of the lower housing and configured to prevent the lower housing from being shrunk by heat generated from the LEDs interposed between the upper housing and the lower housing;
   an upper connector and a lower connector configured to couple the power source cables together and combined in up and down directions on each of the both sides of the upper housing and the lower housing;
   through holes formed in each of top surfaces of the upper and lower connectors;
   cable guides formed in each of the upper connector and the lower connector on a side where the upper and lower connectors and come into contact with each other, wherein the cable guides each are configured to have a semicircular longitudinal section in a length direction of the upper and lower connectors so that when the upper and lower connectors overlap each other in the up and down directions, the cable guides of the upper connector and the cable guides of the lower connector are brought into contact with each other, such that forming respective circular through holes through which the power source cables configured to pass; and
   fixing screw holes respectively formed on both sides of the upper and lower connectors and configured to screw the LED illumination module.

2. The LED illumination module as claimed in claim 1, wherein the power supply device comprises:
   a circuit protection unit configured to break overcurrent and overvoltage;
   a rectifying unit configured to rectify an AC power source, received from the circuit protection unit, into a DC power source;
   a constant voltage generator configured to convert the DC power source into a voltage of a certain level such that the DC power source complies with a driving voltage of the LEDs; and
   a constant current generator mounted on the constant voltage generator and configured to supply the LEDs with only a necessary amount of current received from the constant voltage generator.

3. The LED illumination module as claimed in claim 2, wherein:
   the circuit protection unit comprises a fuse connected in series to an AC power terminal and a Varistor connected in series or in parallel across the AC power terminal,
   the rectifying unit comprises a bridge diode configured to rectify the AC power source received from the AC power terminal, and a capacitor connected in parallel to the output terminal of the bridge diode and configured to remove a ripple voltage generated from the bridge diode, and
   the constant voltage generator and the constant current generator are constructed by connecting a constant voltage IC and a constant current IC, respectively, to the output terminal of the rectifying unit from which the ripple voltage is being removed.

* * * * *